United States Patent [19]

Herbert

[11] Patent Number: 5,638,283

[45] Date of Patent: Jun. 10, 1997

[54] FRANKING MACHINE

[75] Inventor: Raymond J. Herbert, Leigh-on-Sea, United Kingdom

[73] Assignee: Neopost Limited, Essex, United Kingdom

[21] Appl. No.: 379,967

[22] Filed: Jan. 27, 1995

[30] Foreign Application Priority Data

Jan. 31, 1994 [GB] United Kingdom ............... 9401757

[51] Int. Cl.⁶ .................................................. G07B 17/04
[52] U.S. Cl. ................................................. 364/464.2
[58] Field of Search .................. 364/464.02, 464.03, 364/559, 560, 571.01

[56] References Cited

U.S. PATENT DOCUMENTS 4,933,849  6/1990  Connell et al. ............... 364/464.02

Primary Examiner—Edward R. Cosimano
Attorney, Agent, or Firm—Shoemaker and Mattare Ltd.

[57] ABSTRACT

A franking machine is provided with receiver means to receive positional signals from a global positioning system. The franking machine may be operated to print positional data as part of a franking impression printed on mail items whereby the postal authority is enabled by inspection of mail items to determine that the franking machine is being used at its authorised location. The franking machine may be arranged to be inhibited from operation if not located at its authorised location. The positional signals may be utilised to correct variation in output of a weighscale due to gravitational variation.

9 Claims, 2 Drawing Sheets

FRANKING MACHINE

BACKGROUND OF THE INVENTION

This invention relates to franking machines and in particular to the provision of security in respect of use of such machines for franking mail items.

Franking machines are known for printing a franking impression on mail items, the franking impression including a value of postage charge and other postage data such as the date of printing the franking impression to indicate to a postal authority for postage charge has been levied on the mail item. Use of the franking machine is licensed by the postal authority and for reasons of security in handling of mail items franked with postage charge by a franking machine, the franking machine is permitted to be used at a single location and the franked mail items are handled by a specific postal office usually in the same general area at which the franking machine is located. The printed franking impression includes the name of the town appropriate to franking of mail items by that franking machine. In franking machines in which the invariable part of the franking impression, that is the parts of the franking impression other than the value of postage charge and the date which are variable, are printed by means of a printing die the name of postal town is included in the printing die. In franking machines which utilise digital printers in which a plurality of printing elements are operated selectively to print dots such as to build up line by line the franking impression, the franking machine stores print data to cause the printer to print the name of the postal town in the franking impression.

SUMMARY OF THE INVENTION

According to the invention a franking machine includes electronic accounting and control means operable to carry out franking operations to frank mail items with postage charges; means operative to determine the location of the franking machine relative to a global positioning system and to output a signal representing said determined location of the franking machine; and said electronic accounting and control means being responsive to said signal representing the determined location of the franking machine to generate an indication of the location of the franking machine during said franking operations.

BRIEF DESCRIPTION OF THE DRAWING

An embodiment of the invention will now be described by way of example with reference to the drawings in which.

DESCRIPTION OF THE PREFERRED EMBODIMENT

Figure 1:
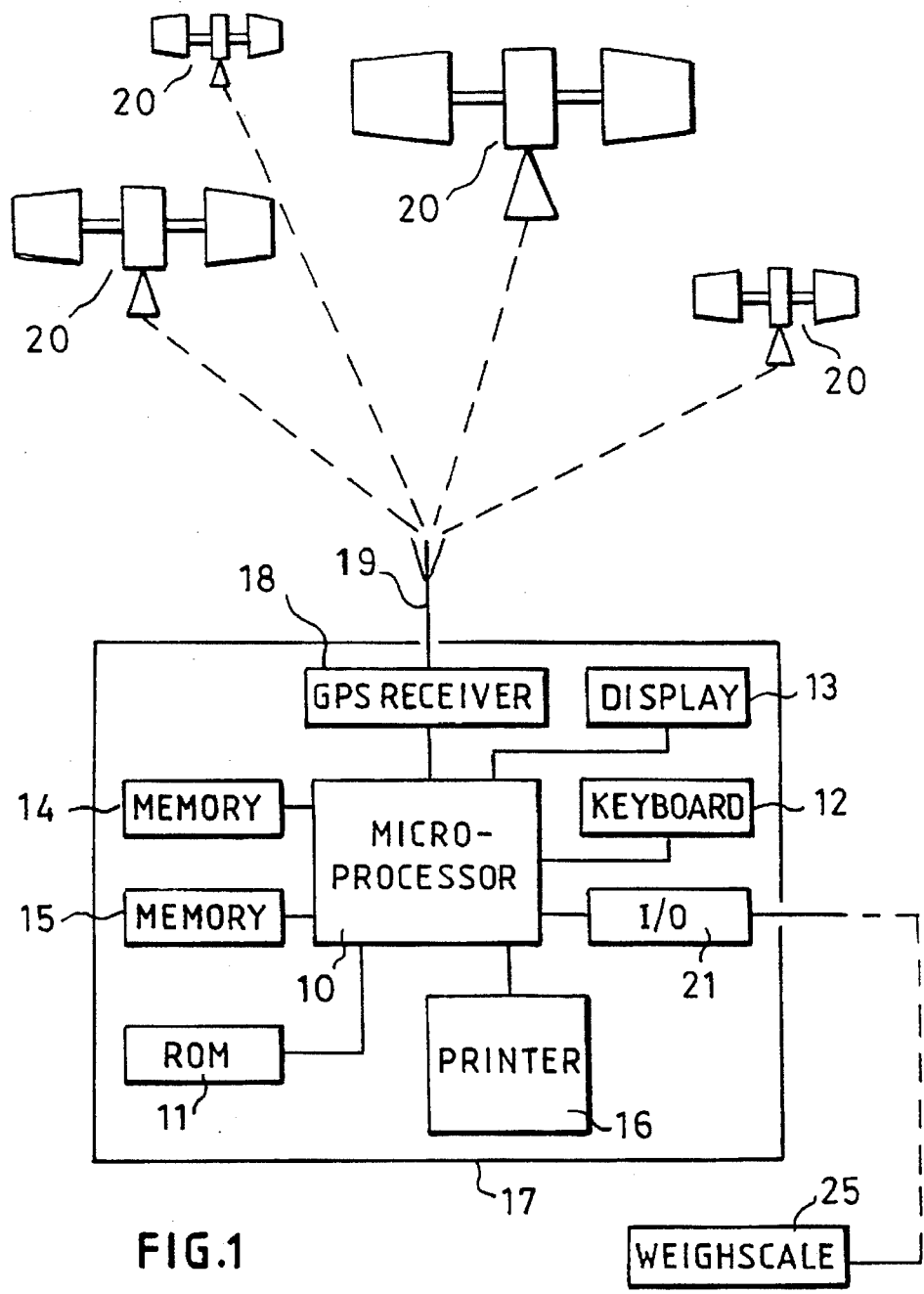
FIG. 1 is a block diagram a franking machine in combination with a global positioning system.

Referring to the drawing a franking machine includes a microprocessor 10 operable under the control of software routines stored in read only memory (ROM) 11 to carry out accounting and control functions of the franking machine. A keyboard 12 enables input by a user of control signals to the microprocessor to cause the microprocessor to carry out a selected operation, for example franking a mail item or recrediting the franking machine with an amount of credit. The keyboard also enables input by the user of data, for example a value of a postage charge with which a mail item is to be franked by the machine. A display device 13 is operated by the microprocessor to display to the user an echo of data input by means of the keyboard and status information and other information to assist the user in use of the franking machine. Non-volatile memories 14, 15 are provided to store accounting data relating to credit entered into the machine and usage of the machine in franking mail items. As is well known the memories 14, 15 usually include a number of registers. For example a descending credit register to store a value of credit available for use in franking of mail items, an ascending register to store an accumulated value of postage charges applied to mail items, an items count register to store the number of mail items franked and a high items count register to store the number of mail items franked with a postage charge greater than a predetermined value. Commonly, postal authorities permit franking machines to be operated in a so-called prepayment mode in which a value of credit is purchased from the postal authority and this value of credit is entered into the descending register of the franking machine. Thereafter the franking machine is operable for use in franking mail items until such time as the credit is exhausted or has decreased to a predetermined low value. Accordingly as a part of each franking routine carried out by the microprocessor, the microprocessor carries out a check to determine that there is a sufficient value of credit registered in the descending register to enable the currently required franking operation to be performed. If the credit is sufficient the franking operation continues and the mail item is printed, by means of a printer 16 controlled by the microprocessor, with a franking impression including the value of postage charge. If the credit value is determined to be insufficient, the franking machine is rendered inoperative for further franking until such time as the descending register has been recharged with credit purchased from the postal authority. Other postal authorities permit franking machines to be used in a so-called post-payment mode in which the franking machine does not store a value of credit and periodically the postal authority inspects the franking machine to determine the value of postage charge which has been applied to mail items and then charges the user in accordance with that determined value.

In order to ensure integrity of the accounting data, each register is provided in duplicate in each of the memories 14, 15 and in each franking operation the microprocessor carries out a check to determine if the accounting data stored in each replication of each register is identical. If identity is not found, the franking machine is rendered inoperative until any fault has been diagnosed and corrected by an authorised service engineer. In order to prevent tampering or other unauthorised interference with and unauthorised operation of the accounting circuits of the franking machine, all circuits critical to maintenance of the accounting records and circuits for operation of the printer are housed in a secure housing 17.

Use of a franking machine is licensed by the postal authority and the postal authority would usually be aware of the person or company using the machine and the location at which the machine is used. However, in fraudulent use of the franking machine, the franking machine may be removed to another location and the postal authority would have difficulty in finding the location at which the franking machine is being used fraudutently.

Fraudulent use of the franking machine in which the franking machine is used at locations other than the usual location for use of that franking machine may be prevented, or discovery of such use may be facilitated, by providing the franking machine with means operative during use of the franking machine to determine the location of the franking machine. Such means may inhibit operation of the franking machine at any location other than that authorised for use of the machine or may instead or in addition provide an indication of any location at which the franking machine is operated to print franking impressions and thereby frank mail items.

Figure 3:
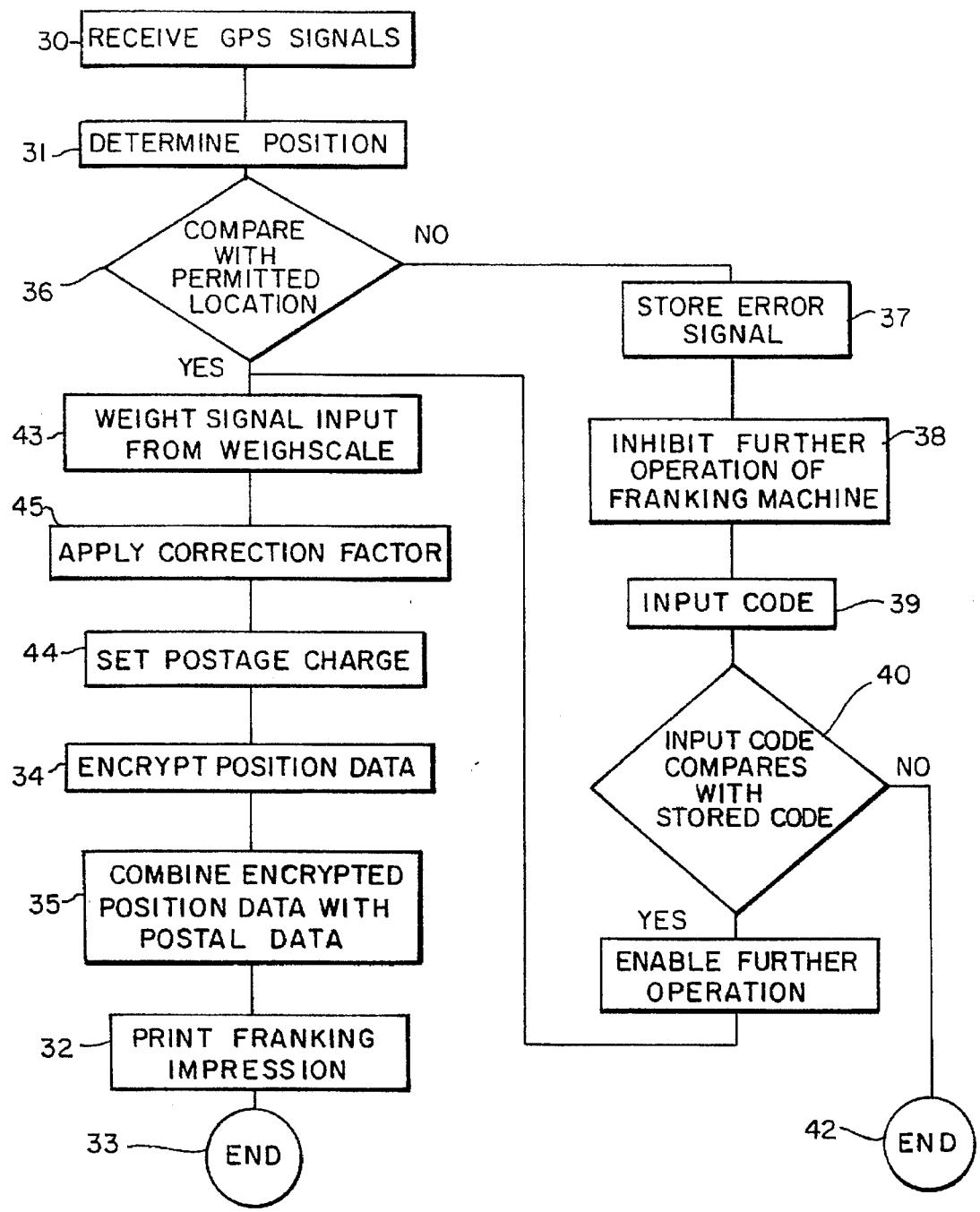
FIG. 3 is a flow chart of the operation of the franking machine in relation to position data from a global positioning system.

Accordingly as proposed by the present invention, a global positioning system receiver 18 is provided to output a signal to the microprocessor representing the location of the franking machine. Referring now to FIGS. 1 and 3 receiver 18 has an aerial 19 by which the receiver receives (block 30) signals from a plurality of satellites 20 of a global positioning system, the satellites 20 being located in orbit around the earth. The satellites are located such that at substantially any location on earth, signals can be received from four satellites. The timing of transmission of signals from each satellite is co-ordinated accurately so that the timing of reception of these transmitted signals by the receiver enables the receiver to determine the location of the receiver. A global positioning system comprising a plurality of satellites in earth orbit is currently operational and this system enables the receiver to determine (block 31) its location to within 15 meters. Generally, the global positioning system is intended for navigations purposes to enable ships and aircraft to pin-point there location.

Figure 2:
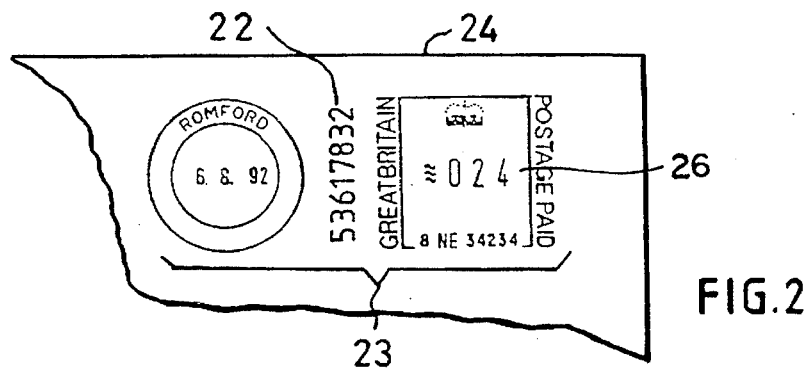
FIG. 2 illustrates a franking impression including position data.

The microprocessor of the franking machine is responsive to the position representing signal output by the receiver 18 to operate the printer 16 to print (block 32) positional data 22 (FIG. 2) as a part of the franking impression 23 printed on mail items 24 and then end (block 33) the franking operation. The positional data 22 may be printed as co-ordinates of latitude and longitude in plain text but it is preferred that the positional data be printed in coded form and for example may be printed as a bar code. If additional security is required in the location data printed on the mail item, the location data may be encrypted (block 34) prior to printing. Accordingly postal authorities would be enabled from an inspection of franked mail items either by visual inspection or automatic machine reading of the franking impression to determine the location at which the franking machine has been used to frank those mail items. The accuracy of the positioning system is sufficient to enable the location at which the franking machine has been used to be pin-pointed in some cases to a single building. The location data may be printed as a stand-alone item of data or the location data may be incorporated (block 35) with postage data, for example one or more of date of franking, items count, postage charge, into a combined coded message. It will be appreciated that the positional data 22, either in plain text or in code, may be printed in any desired and convenient location of the franking impression 23 and for example may have a vertical orientation as shown in FIG. 2 or may extend horizontally. Furthermore the positional data may be printed as a single data item as shown in FIG. 2 or may be divided into two or more items. For example, if desired, the co-ordinates of latitude may be printed as one item and the co-ordinates of longitude be printed as a second item.

The franking machine may store within the non-volatile memories 14, 15 data relating to the location at which the franking machine is licensed to be used. The licensed location would usually cover the area of a town and the name of the town is printed in the franking impression and the stored location data comprises co-ordinates corresponding to the area of the town. During operation of the franking machine for franking mail items, the microprocessor carries out a comparison (determination block 36) of the location of the franking machine as indicated by the signal output from the receiver 18 with the stored location data corresponding to the location at which the franking machine is licensed to be used. If the comparison indicates equality (YES output of determination block 36) the franking machine proceeds with the franking operation. If the comparison does not indicate equality, (NO output of determination block 40) the franking machine may store (block 37) an indicating of the occurrence of a mismatch and alternatively or in addition include within the printed franking impression an indication of the occurrence of the mismatch. Instead of carrying out a comparison, in each franking operation the microprocessor may store in the memories 14, 15 the location coordinates represented by the output of the receiver 18. This information would then be available for inspection using test equipment connected to a communication port 21 of the franking machine or the location data may be read out at the same time as the contents of those registers which store accounting data are read out, such reading out of accounting data usually being effected each time a recredit operation to recharge the franking machine with credit is effected. The read out of location data may be transmitted to a remote postal authority centre or may included in a report statement printed by the printer 16. It will be appreciated that the location representing signal output by the receiver 18 may have a precision much higher than that required to correspond to the relatively large town area in which a franking machine is permitted to be used. Accordingly the receiver may be arranged to output signals only to a precision required to determine the location of the franking machine or the microprocessor may carry out the comparison upon only sufficient higher order digits of the position representing signal as to correspond to the precision of determination of the location of the franking machine.

If desired, for reasons of security, the occurrence of a mismatch between the stored location data and the location data output from the receiver may be utilised by the microprocessor 10 to inhibit (block 38) further operation of the franking machine in franking of ail items until an inspection of the franking machine authorised by the postal authority has been carried out to determine if the franking machine has been used in an unauthorised manner.

It will be appreciated that the receiver 18 is located within the secure housing in order to prevent input of false location signals to the microprocessor 10. The aerial 19 may be located internally of the housing when the franking machine is to be used in locations where the signal strength of signals received from the satellites is relatively strong but in locations where the signal strength is weak an aerial external to the housing may need to be provided.

It is possible that in some locations where the franking machine is to be used, due to the structure of the building or other reason, the required location signals may not be received or may not be received with sufficient strength to enable the receiver to output location representing signals to the microprocessor. Also at times there may be a failure in the position system so that location representing signals are not input to the microprocessor. Accordingly, and in particular when the microprocessor is arranged to operate such as to inhibit franking operations, if no location representing signals are received by the microprocessor or if the location representing signals received do not match the location in which the franking machine is authorised to be used, the postal authority upon request from the user may authorised the user to continue using the franking machine. This may be accomplished by communicating to the user a code to be input (block 39) by the user by means of the keyboard to which the microprocessor is responsive such as to permit limited continued operation of the franking machine. A code is stored in the non-volatile memory 14, 15 and the code keyed in by the user is compared (determination block 40) with the stored code. If the comparison is satisfactory (YES output of determination block 40) the microprocessor is enabled (block 41) to perform further franking operations. The franking operations enabled to be performed may be limited either by time or by the number of items franked. Instead of the code being entered by means of the keyboard, the code may be transmitted direct from the remote postal authority centre to the franking machine by means of the communication port of the franking machine. If the comparison is unsatisfactory (NO output of determination block 40) operation of the franking machine is terminated (END block 42).

It is common for a weighscale 25 to be connected to the franking machine and to be used for weighing mail items prior to franking thereof, the weighscale generating a signal which is input (block 43) to the franking machine via communication port 21 to set (block 44 the franking machine to print a postage charge 26 in the franking impression of a value corresponding to the weight of the item 24 to be franked. Due to different gravitational forces acting on the weighscale at different locations, the output of the weighscale may be in error and this error may be as high as 5 grammes. Accordingly weighscales need to be calibrated for the specific location at which they are to be used. The global position system receiver 18 of the franking machine may be utilised to enable the automatic application (block 45) of a correction factor to the output of the weighscale in dependence upon the location of the franking machine determined by the receiver 18. A look up table may be stored in the franking machine, the look-up table containing correction factors to be applied in respect of a plurality of different locations on the earth. The location representing signals output from the receiver are utilised to access the table to read out the appropriate correction factor from the look-up table.

I claim:

1. A franking machine including electronic accounting and control means operable to carry out franking operations to frank mail items with postage charges; means operative to determine the location of the franking machine relative to a global positioning system and to output a signal representing said determined location of the franking machine; and said electronic accounting and control means being responsive to said signal representing the determined location of the franking machine to generate an indication of the location of the franking machine during said franking operations.

2. A franking machine as claimed in claim 1 and including a weighscale connected thereto, said weighscale being operative to output a weighscale output signal corresponding to weight of a mail item to be franked; and including means responsive to the location representing signal to apply a correction factor to the weighscale output signal such as to correct the weighscale output signal in respect of gravitational force present at the determined location of the franking machine.

3. A franking machine as claimed in claim 1 including means to store position data relating to a permitted location for use of the franking machine and wherein the electronic accounting and control means is operative in the franking operations to compare the location representing signal with said stored position data and to generate an error signal in response to a mismatch in the comparison.

4. A franking machine as claimed in claim 3 wherein the electronic accounting and control means is operative in response to generation of the error signal to inhibit operation of the franking machine for franking mail items.

5. A franking machine as claimed in claim 4 wherein the electronic accounting and control means is responsive to input of a predetermined code to carry out franking operations when comparison of the location representing signal with the stored position data is unsuccessful.

6. A franking machine as claimed in claim 1 wherein the electronic accounting and control means is operative in each franking operation to operate printing means to print a franking impression on the mail item, said franking impression including data relating to the determined location of the franking machine.

7. A franking machine as claimed in claim 6 wherein the electronic accounting and control means is operative to combine the data relating to the determined location of the franking machine with postage data into a coded message and to print the code message as part of the franking impression.

8. A franking machine as claimed in claim 6 wherein the data relating to the determined location of the franking machine is printed in coded form in the franking impression.

9. A franking machine as claimed in claim 8 wherein the electronic accounting and control means is operative to combine the data relating to the determined location of the franking machine with postage data into a coded message and to print the code message as part of the franking impression.

* * * * *